(12) United States Patent
Prins

(10) Patent No.: US 8,881,969 B1
(45) Date of Patent: Nov. 11, 2014

(54) RECYCLE STRIP

(71) Applicant: Fred Prins, Fort Lee, NJ (US)

(72) Inventor: Fred Prins, Fort Lee, NJ (US)

(\*) Notice: Subject to any disclaimer, the term of this patent is extended or adjusted under 35 U.S.C. 154(b) by 0 days.

(21) Appl. No.: 14/268,166

(22) Filed: May 2, 2014

Related U.S. Application Data

(63) Continuation-in-part of application No. 13/793,191, filed on Mar. 11, 2013, now abandoned.

(51) Int. Cl.
 *B65D 17/00* (2006.01)
 *B65D 21/08* (2006.01)

(52) U.S. Cl.
 CPC .................................. *B65D 21/086* (2013.01)
 USPC ............................ 229/240; 229/241; 206/736

(58) Field of Classification Search
 USPC ................. 229/240, 227, 235, 236, 238, 239, 229/101.1, 230, 926, 210, 200, 123.3, 229/198.3, 120.011; 206/746
 See application file for complete search history.

(56) References Cited

U.S. PATENT DOCUMENTS

| | | | |
|---|---|---|---|
| 2,751,964 | A | 6/1956 | Guyer |
| 2,909,312 | A | 10/1959 | Conerty |
| 3,043,490 | A | 7/1962 | Burnett |
| 3,168,234 | A | 2/1965 | Bartz |
| 3,469,766 | A | 9/1969 | Nelson |
| 4,558,785 | A | 12/1985 | Gordon |
| 5,090,614 | A | 2/1992 | Kupersmit |
| 5,108,000 | A | 4/1992 | Stoll |
| 5,163,612 | A | 11/1992 | Ashby |
| 5,251,819 | A | 10/1993 | McHugh |
| 5,348,147 | A | 9/1994 | Gottfreid |
| 5,464,151 | A | 11/1995 | Parker et al. |
| 5,510,165 | A | 4/1996 | Seki |
| 5,671,883 | A | 9/1997 | Philips |
| 5,752,650 | A | 5/1998 | Henderson |
| 6,364,202 | B1 | 4/2002 | Zelley |
| 6,976,588 | B2 | 12/2005 | Wischusen |
| 7,490,754 | B2 | 2/2009 | Opferbeck |
| 2001/0032873 | A1 | 10/2001 | Grueneberg |

FOREIGN PATENT DOCUMENTS

JP         403275438         12/1991

*Primary Examiner* — Christopher Demeree

(57) ABSTRACT

A system for promoting and facilitating recycling having a recycle strip placed in consumer packaging that includes paperboard, chipboard and corrugated cardboard that has a consistent, conspicuous appearance and is placed in a conspicuous manner into the packaging so that the consumer recognizes that the packaging is recyclable. When removed from the package, the strip disables a plurality of structural elements of the packaging, the elements no longer maintaining the package in three dimensions, allowing the consumer to easily flatten the packaging for accumulation and eventual recycling. When placed, the strip selectively binds to the sides of the packaging, eliminating any weakness in the packaging, and selectively releases when a consumer pulls the strip from the packaging, separating the packaging into elements but maintaining a unitary article.

6 Claims, 12 Drawing Sheets

RECYCLE STRIP

CROSS-REFERENCE TO RELATED APPLICATIONS

This application is a nonprovisional continuation-in-part utility application of the nonprovisional utility application Ser. No. 13/793,191, filed in the United States Patent Office on May 11, 2013, that claims priority to the provisional patent application Ser. No. 61/647,799 filed in the United States Patent Office on May 16, 2012 and this application claims the priority thereof and is expressly incorporated herein by reference in its entirety.

TECHNICAL FIELD

The present disclosure relates generally to a package with a recycle strip and a system and method for making same. More particularly, the present disclosure relates to a package with a recycle strip that signals to consumers that the packaging is easily disassemble for recycling and a system and method for same.

BACKGROUND

Paperboard, chipboard and corrugated cardboard contribute to the waste stream, but are completely recyclable. Manufacturers of packaging want to encourage consumers to recycle, thus lowering the carbon footprint of the industry. Consumer goods manufacturers who offer their goods for sale in paperboard, chipboard and corrugated cardboard also want to lower their carbon footprint throughout the life cycle of the packaging. Most consumers are unaware that type of packaging is generally recyclable.

There are many ways to open packaging for the purpose of removing the goods inside, including packaging that has a second use as a display but none that relate to recycling. While these units may be suitable for the particular purpose employed, or for general use, they would not be as suitable for the purposes of the present disclosure as disclosed hereafter. While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is create a signal to the consumer that packaging is recyclable. Accordingly, an example embodiment in the present disclosure is a recycle strip placed in a conspicuous manner in packaging so that consumer recognizes that packaging is recyclable.

Another aspect of an example embodiment in the present disclosure is create a consistent signal to the consumer that packaging is recyclable. Accordingly, an example embodiment in the present disclosure is a recycle strip having a consistent appearance when placed in packaging so that consumer recognizes that packaging is recyclable.

The present disclosure describes a system for facilitating recycling having a recycle strip placed in consumer packaging that includes paperboard, chipboard and corrugated cardboard that has a consistent appearance and is placed in a conspicuous manner into the packaging so that the consumer recognizes that the packaging is recyclable. When torn from the package, the strip disables a plurality of structural elements of the packaging, the elements no longer maintaining the package in three dimensions, allowing the consumer to easily flatten the packaging for storage and eventual recycling. When placed the strip selectively binds to the sides of the packaging, eliminating any weakness in the packaging, and selectively releases when a consumer pulls the strip from the packaging, separating the packaging into portions but maintaining a unitary article.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
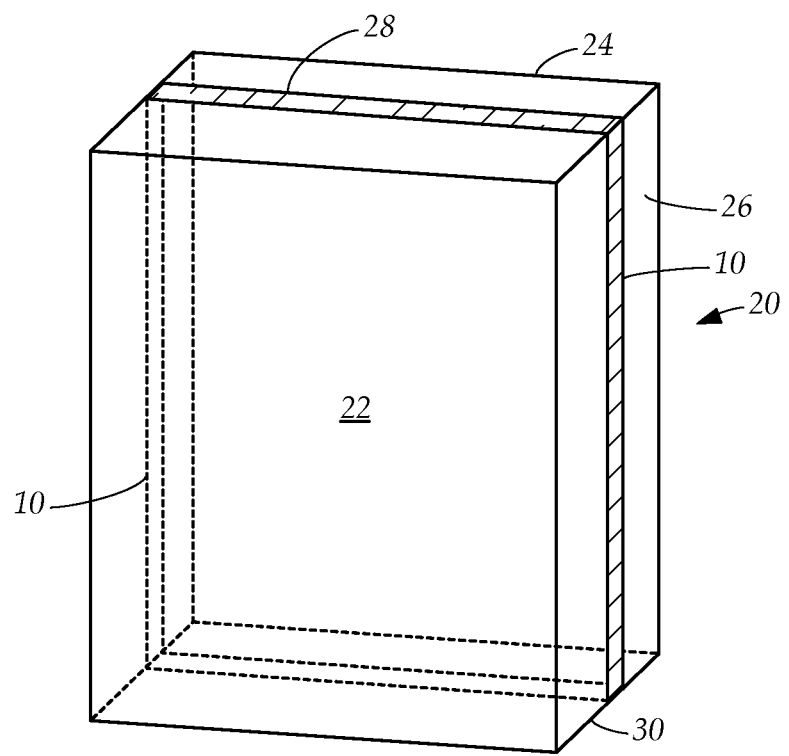
FIG. 1 is a perspective view of an example embodiment of a paperboard package with a recycle strip in a longitudinal orientation.

FIG. 1 illustrates an example embodiment of a package, such as, for example, a cereal carton, the paperboard carton 20 having a RECYCLESTRIP™ recycle strip 10. The recycle strip is a member in a system of packaging that prompts recycling of a plurality of boxes and cartons. The packaging is made from recyclable materials selected from the group consisting of paperboard, chipboard and corrugated cardboard.

A user instantly recognizes the recycle strip 10 and further recognizes that the package is recyclable, the recycle strip signally a consistent message across a plurality of brands and package styles. The package defines a volume in three dimensions when assembled, having a plurality of members, namely a front panel 22, a rear panel 24, a pair of side panels 26, a top flap 28 and a bottom flap 30, the panels defining a volume therein, the volume operative for filling with a product. In this example embodiment, the recycle strip 10 is a member added to the other members, the strip inserting in and binding to the side panels, the bottom panel and the top panel, allowing the front panel and the rear panel to provide a pair of principal display panels. In this example embodiment, the recycle strip 10 is a continuous plastic strip inserted into the package, traversing a plurality of adjacent members, binding the adjacent members of the package together. When the user no longer needs the package, the strip is selectively released from the package, forming a plurality of portions that easily flatten and compress, the package completely disassembled. The flattened packages will yield more room in a recycling accumulation container during accumulation, the container having an increased capacity for the flattened and compressed packages. The increased capacity of the accumulation container increases transportation capacity operative for delivering the compressed packages to a material recovery facility, by increasing the capacity of the trucks that deliver accumulated packages to the processing centers MRF (Material Recovery Facility) further reducing the carbon foot print that is attributable to packaging.

Figure 2A:
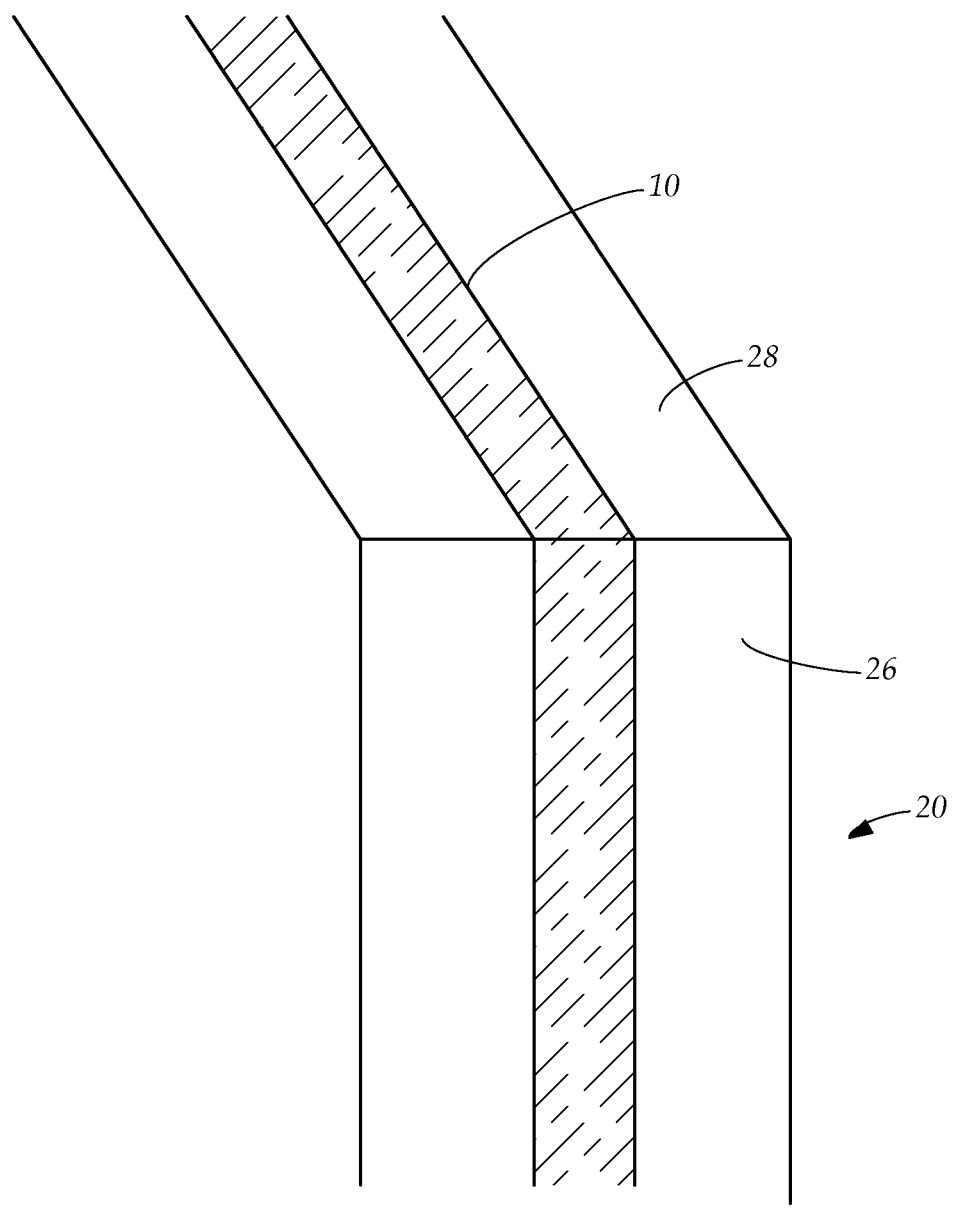
FIG. 2A is a perspective view of a section of the paperboard package with the recycle strip shown in detail.
Figure 2B:
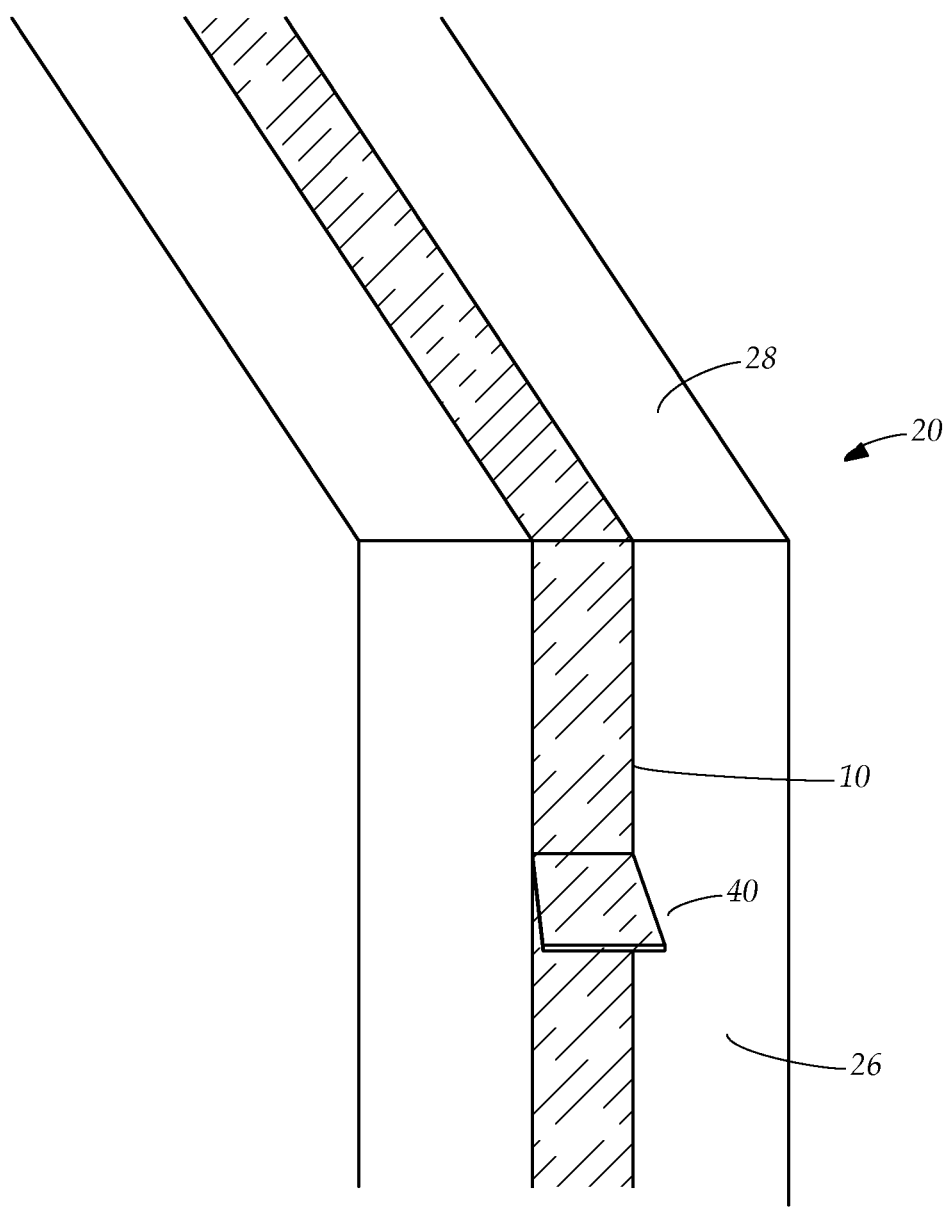
FIG. 2B, similar to FIG. 2A, is a perspective view of a section of the paperboard package with the recycle strip with a peelable cover over a leading end of the strip.
Figure 2C:
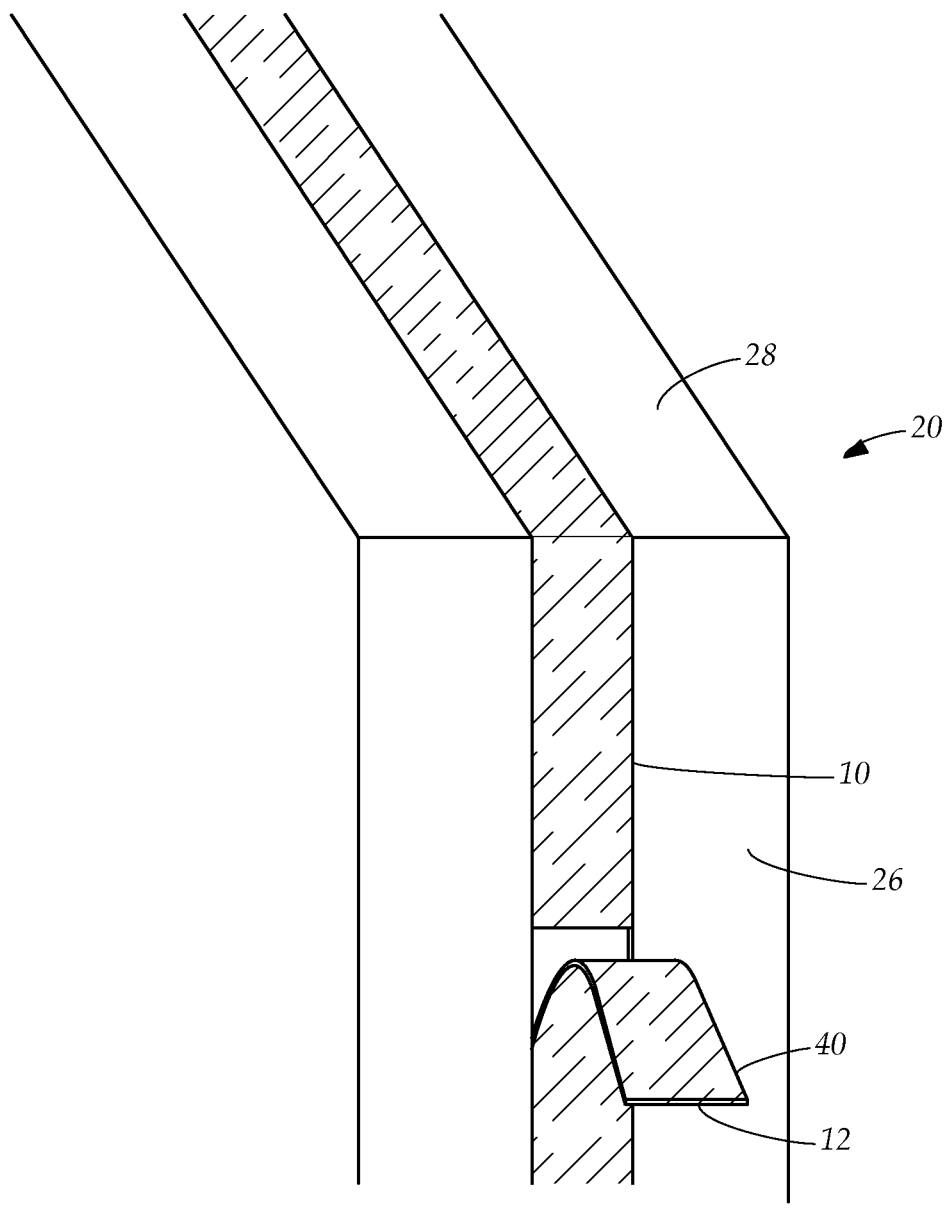
FIG. 2C, similar to FIG. 2B, is a perspective view of a section of the paperboard package with the recycle strip releasing from the packaging, the peelable cover over the leading end of the strip separating the package into a plurality of portions.

FIG. 2A shows the carton 20 with the strip 10 running through the side panel 26. FIG. 2B shows a peelable cover 40 over a leading end of the recycle strip 10 so that the strip is not prematurely released. FIG. 2C shows the peelable cover 40, shown in an opposing manner than in FIG. 2B, with the leading end 12 of the strip 10 releasing a pair of portions of the carton 20, disabling the structural members of the package which maintain a three-dimensional volume.

Figure 3A:
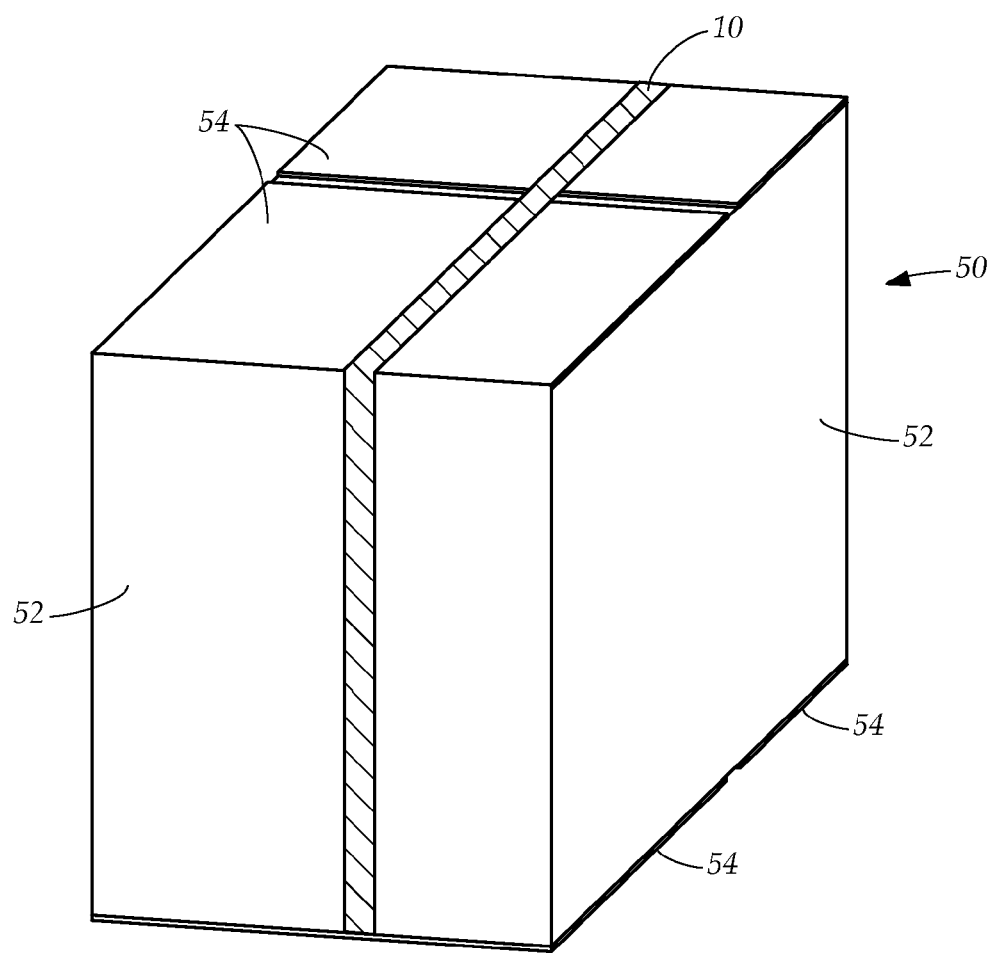
FIG. 3A is a perspective view of an example embodiment of a corrugated cardboard box having a plurality of flaps, the recycle strip bisecting the flaps.

FIG. 3A demonstrates another example embodiment, a corrugated box 50 having a plurality of panels 52 and a plurality of flaps 54, the flaps generally in pairs, that maintains a three-dimensional volume by the flaps 54 folding towards and abutting each other. The strip 10 fixes in and binds to the corrugated cardboard of the flaps 54 and panels so that when the strip releases, a plurality of portions for storage and eventual recycling are formed. Two panels remain completely available for display.

Figure 3B:
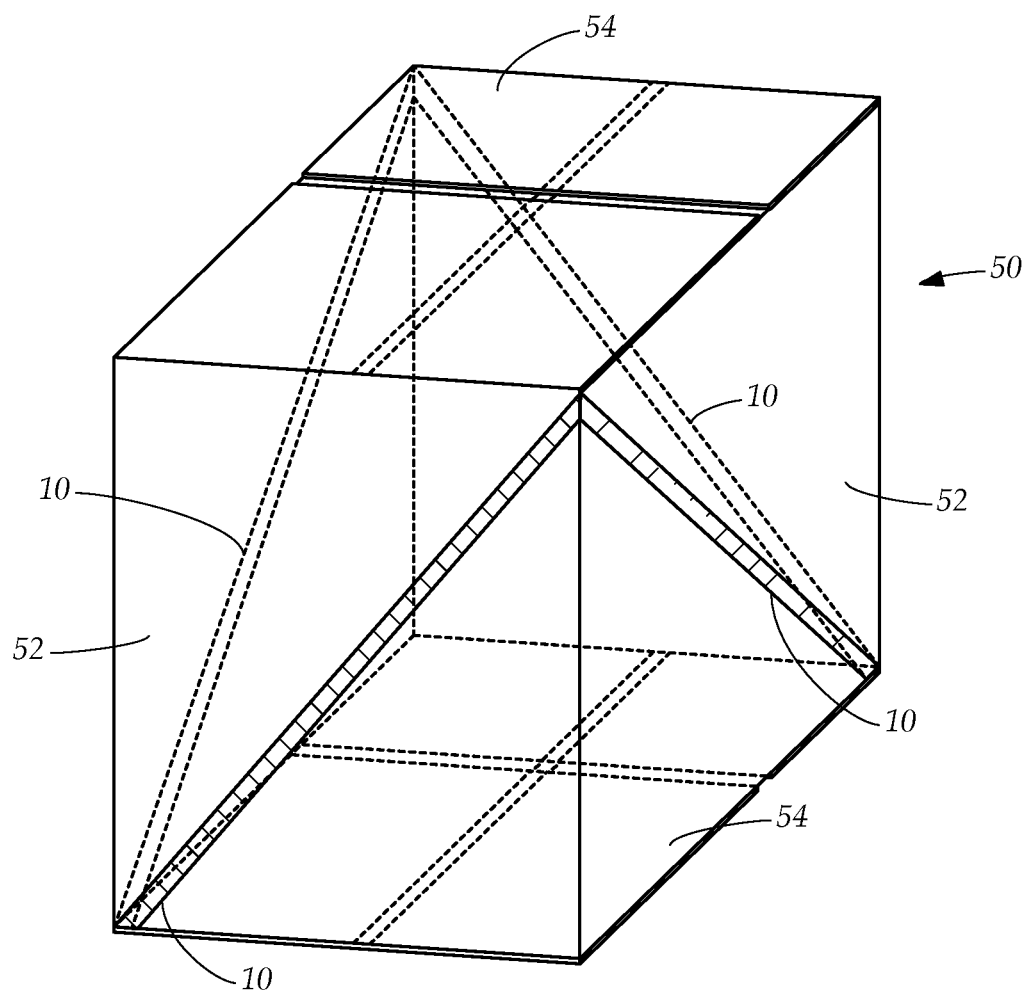
FIG. 3B is a perspective view of another example embodiment of the corrugated cardboard box having a plurality of panels, the recycle strip diagonally bisecting the panels.

FIG. 3B demonstrates the corrugated carton 50 having a strip 10 that traverses the panels 52 diagonally so that the flaps 54 are intact, creating a stronger carton.

Figure 4:
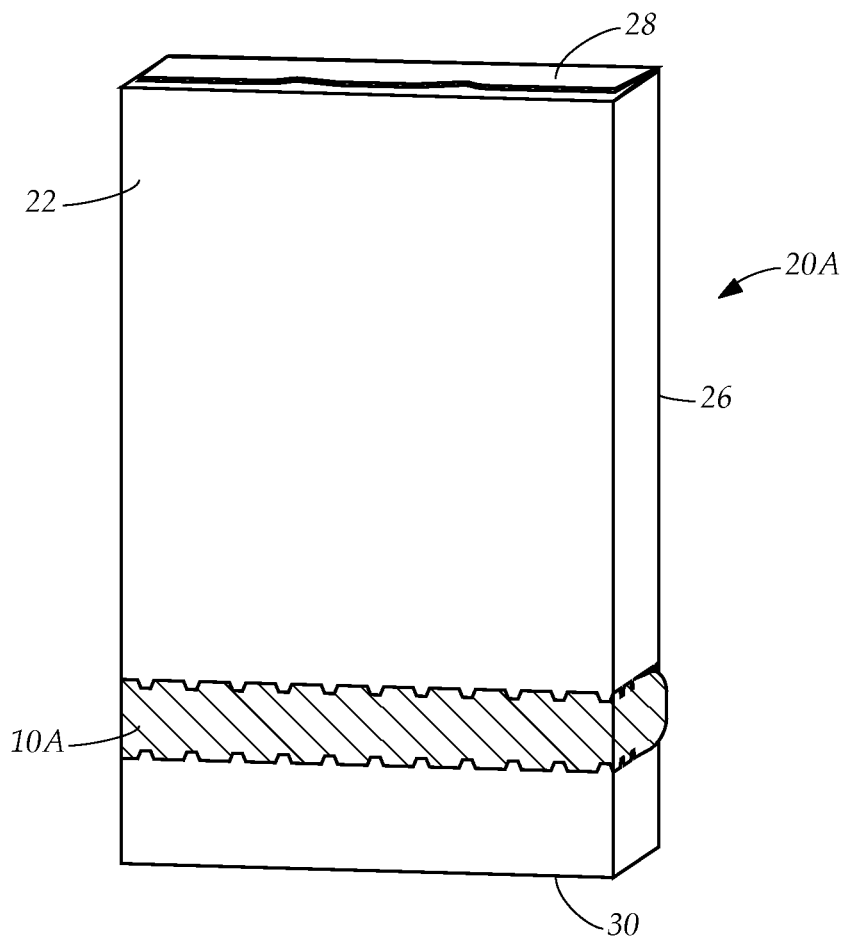
FIG. 4 is a perspective view of an example embodiment of a tube style paperboard box having a plurality of panels, the recycle strip in a lateral orientation.

FIG. 4 shows a system having a tube style carton package 20A with an integral recycle strip 10A, the strip having a conspicuous appearance distinguishing the strip from other members of the package by a plurality of graphic elements, such as color and a plurality of printed symbols. The graphic elements instantly signal that the package is recyclable. The recycle strip traverses the package laterally, towards a carton bottom allowing the front panel 22 shown here or the back panel to have uninterrupted display area on the principal display panels. The system is further shown in FIG. 8 and described hereinbelow.

Figure 5:
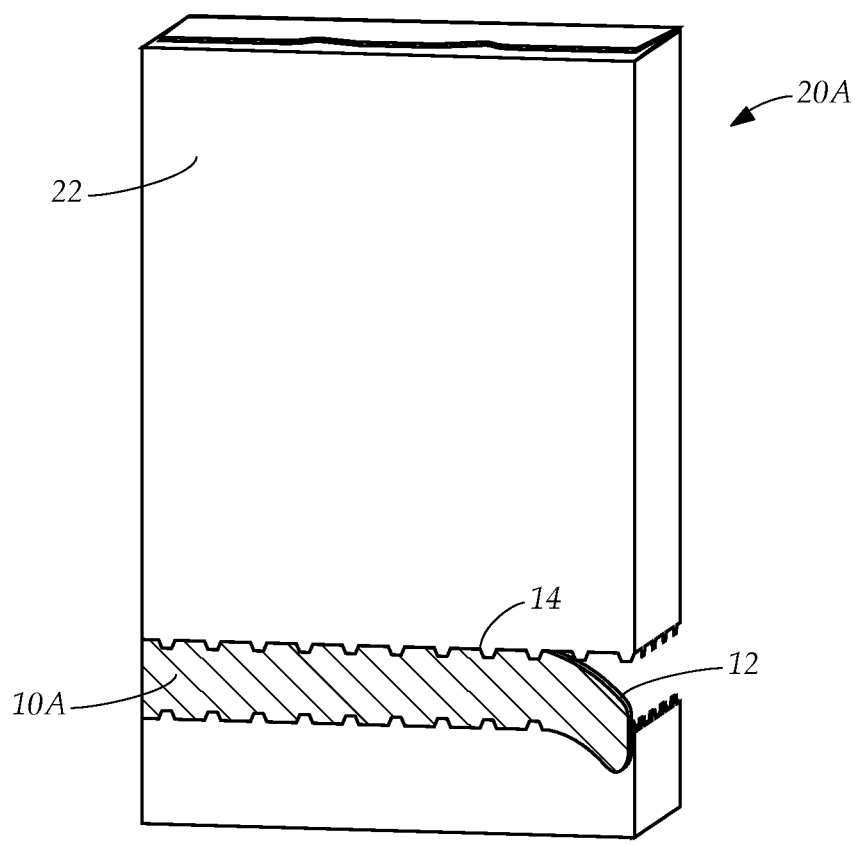
FIG. 5 is a perspective view of the paperboard package showing the recycle strip peeling away.

FIG. 5 demonstrates the process of preparing the carton for recycling. The recycle strip has a leading end with a pull tab 12 that is not glued to a flange panel underneath, allowing the user to easily grasp the leading end of the strip 10A.

The recycle 10A strip has a pair of scalloped perforated edges 14 formed when a carton blank is cut and creased, the scalloped shape of the edges increases the durability of the carton. The scalloped edge is preferable to other shapes of perforations known to those of ordinary skill.

The recycle strip 10A is operative for selectively disassembling the other members of the package when the strip is completely released from the package 20A.

Figure 8:
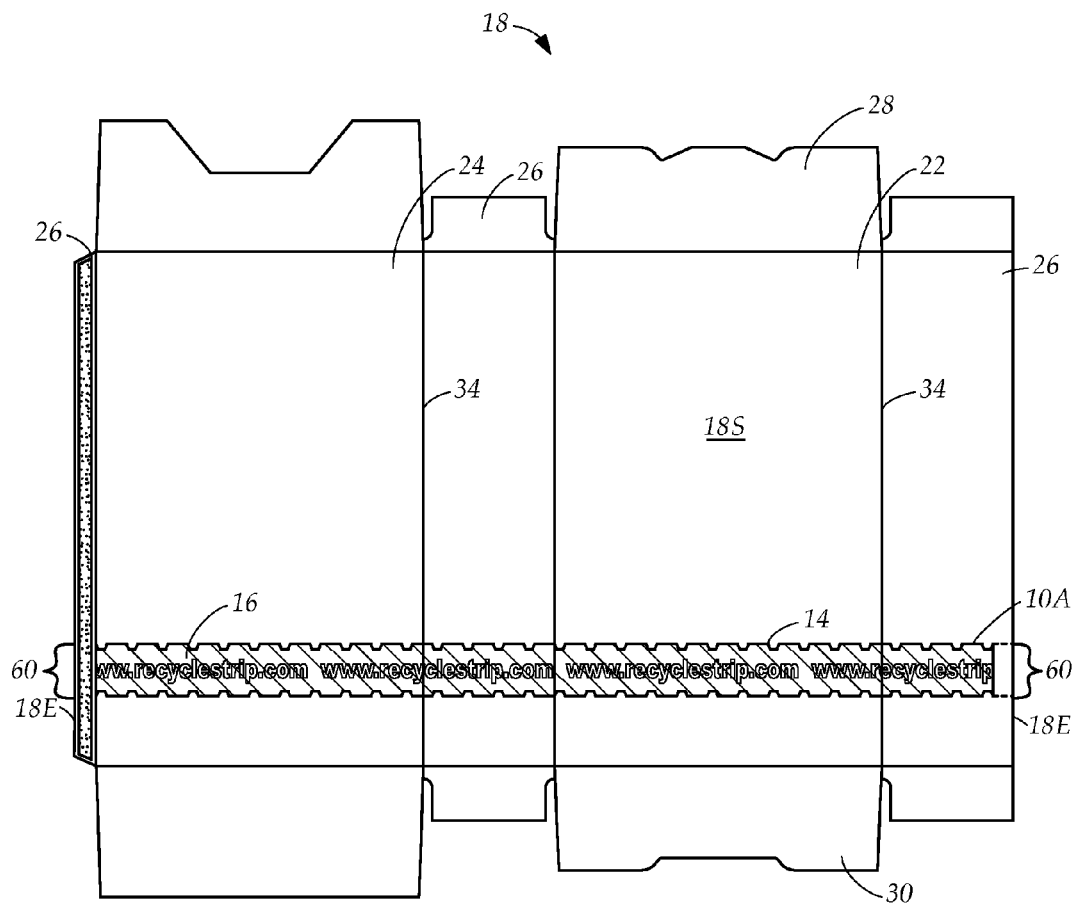
FIG. 8 is a die-cut blank of an example embodiment of a tube style paperboard package before assembly, showing an outer surface of the package before assembly.

FIG. 8 illustrates the blank 18 for a package, a tube style carton described hereinabove. The unitary blank 18 is die-cut from a large sheet of packaging material such as paperboard as a non-limiting example. The blank 18 has a plurality of panels and a plurality of flaps 28, 30 formed from the unitary blank. The panels include a pair of side panels 26 and a pair of principal display panels, a front panel 22, and a back panel 24. The panels and the flaps assembling into a unitary package, defining a volume therein, the volume operative for holding a product.

The recycle strip 16 is perforated from the unitary blank, the strip having a conspicuous appearance distinguishing the strip from the panels 22, 24, 26 and flaps 28, 30. The recycle strip 16 has perforated edges 16 that traverse the principal display panels 24, 24 of the unitary blank; however, the recycle strip 16 approaches the edges 18E of the side panels 26 but terminates before the edges, leaving an unperforated portion forming a strap 60 at the edges 18E of the side panel. The recycle strip 16 is operative for selectively disassembling the package when the strip 16 is completely released from the package, the package disposed for easy flattening and compressing, the panels and flaps no longer defining a volume therein.

Figure 7:
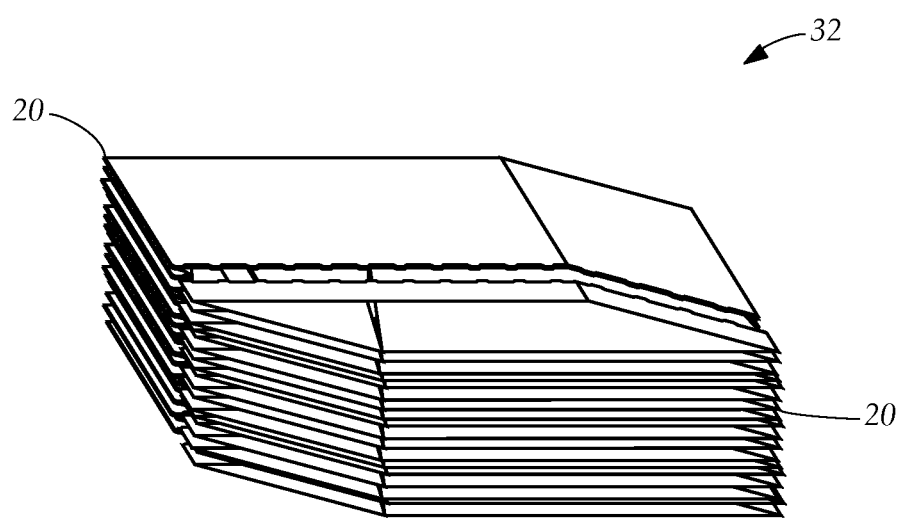
FIG. 7 is a perspective view of plurality of paperboard packages in a stack after the recycle strip is peeled away.

The strap 60 is formed from the unitary blank 18 when the strip 16 is released from the package, the strap 60 maintaining the package as a flat and compressed unit 20 shown in FIG. 7, no longer defining a volume therein, the flattened and compressed unit 20 operative for accumulating in a minimal volume thereby increasing transportation capacity to a material recovery facility and further reducing the carbon foot print that is attributable to packaging.

The blank 18 has an exterior surface 18S that is generally printed with a plurality of graphic design elements shown in FIG. 8. The strip 10A has a conspicuous appearance distinguishing the strip from other members of the package by conspicuous graphic design elements, the graphic design elements instantly signaling that the package is recyclable. As a non-limiting example, the words "recyclestrip" and "www.recyclestrip.com" 16 are printed on the strip 10A and the strip is a conspicuous green color that contrasts with other graphic elements printed on an exterior surface of the blank.

Figure 9:
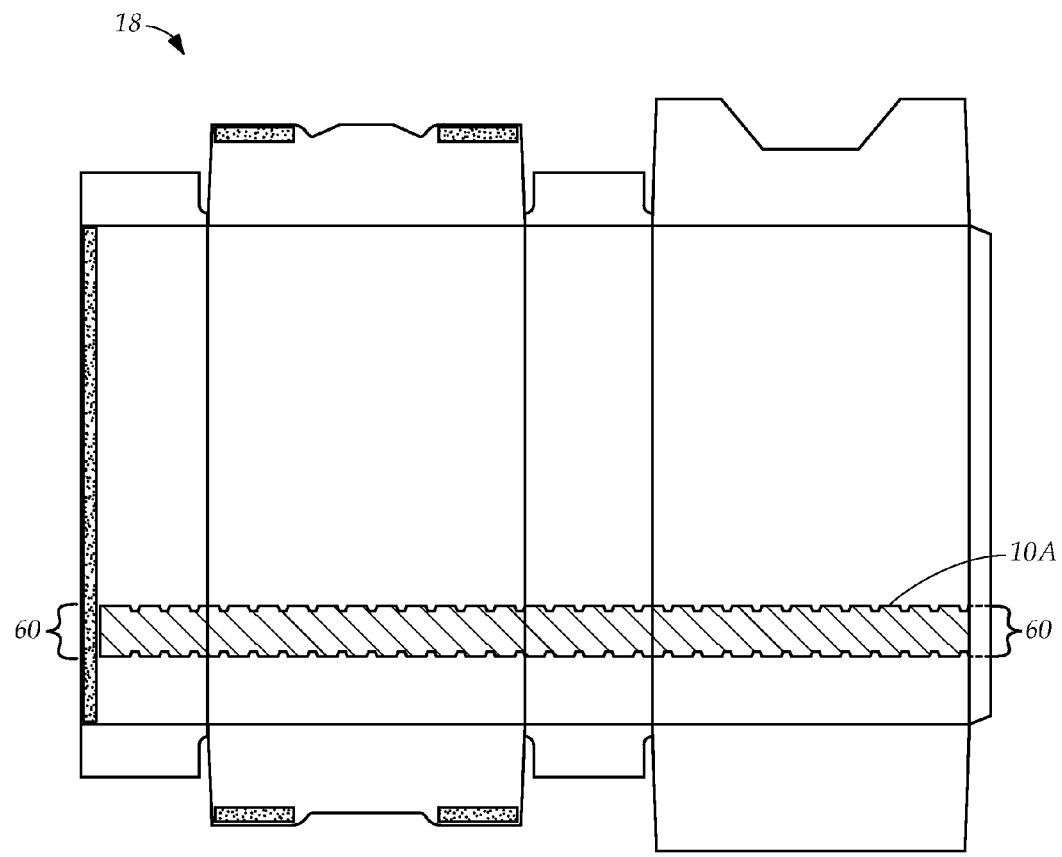
FIG. 9 is a die-cut blank of the paperboard package, showing an inner surface of the paperboard package before assembly.

FIG. 9 displays an interior surface of the blank 18. In this example embodiment, the recycle strip 10A is printed with graphic design elements on the interior surface, further providing a conspicuous reminder that the package is recyclable.

Figure 6:
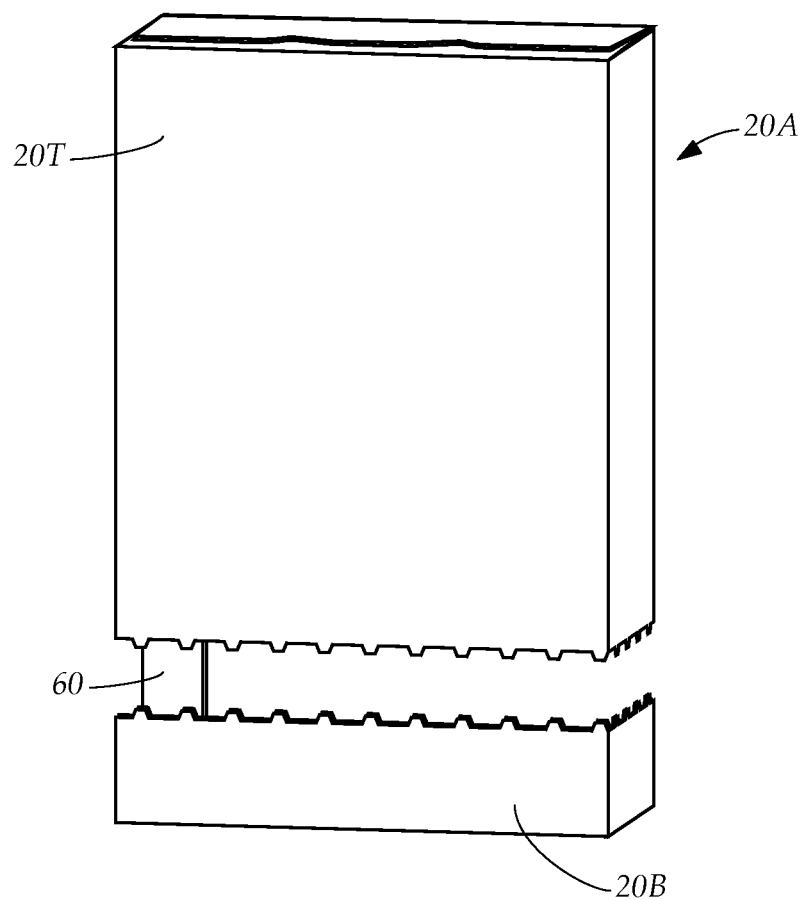
FIG. 6 is a perspective view of an example embodiment of the paperboard package showing the recycle strip peeled away with a strap maintaining a unit.

FIG. 6 shows the strap 60 connecting a top portion 20T of the disassembled carton 20A to a bottom portion 20B, keeping the portions connected for accumulation, preventing the smaller, bottom portion from being inadvertently discarded and not recycled. The recycle strip traverses the carton laterally towards the bottom portion such that principal display panels each have a predominant uninterrupted display area 20T.

FIG. 7 demonstrates a stack 20 of packages 20 with the recycle strip removed, the recycle strip releasing the other members of the package when removed, the other members no longer defining a volume therein. The packages 20 are completely disassembled, the flattened and compressed members of the package accumulating in a minimal volume in the stack 30, operative for transporting to a material recovery facility. The accumulated stack 32 adds capacity to the accumulation container, thereby increasing transportation capacity and further reducing the carbon foot print that is attributable to packaging.

A method for promoting and facilitating recycling packaging and reducing a carbon footprint of a package, is shown in FIG. 8. A sheet of packaging stock has a plurality of blanks 18, as an example in the figure. The blank is printed with a plurality of conspicuous graphic elements 16, the elements instantly signaling that the package is recyclable. The blank also had the flap members 28, 30 and panel members 22, 24, 26 operative for forming the package. The blank has an exterior surface 18S shown here that displays on a package exterior. The conspicuous graphic elements 16 traverse adjacent flaps and panels from a first edge 18E of the blank to an opposing edge 18E of the blank.

The blank 18 is cut from the sheet, fold lines 34 creased into the blank and the recycle strip 10A is perforated, forming a pair of perforated edges 14. In one example embodiment, the perforation edges 14 end before the edges 18E on the side panels 26, the edges having glue such that when the blank 18 is glued together, the unperforated portion forms the strap 60. The strap 60 remains after the perforated strip 10A is released from the carton, maintaining the carton as a unitary piece. The package 20A, as shown in FIG. 4 is formed by folding and glueing the flaps 28, 30 and the side panels 26 together, the flaps and panels defining a volume therein.

Referring to FIG. 5, the package 20A is released by removing the recycle strip 10A by grasping the leading end 12 and the package is completely disassembled when the recycle strip is completely removed, the flaps and panels flattening and compressing operative for accumulating in a minimal volume.

The step of releasing the package 10 is followed by the step of accumulating the compressed and flattened packages as shown in FIG. 7, transporting the flattened and compressed packages to a material recovery facility, the flattened and compressed packages increasing transportation capacity thus further reducing the carbon foot print that is attributable to packaging.

It is understood that when an element is referred hereinabove as being "on" another element, it can be directly on the other element or intervening elements may be present therebetween. In contrast, when an element is referred to as being "directly on" another element, there are no intervening elements present.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a package with a recycle strip placed in the package that signals to consumers that the packaging is easily deconstructed for recycling and a system and method for using same. The disclosure is illustrated by example in the drawing figures, and throughout the written description. It should be understood that numerous variations are possible, while adhering to the inventive concept. Such variations are contemplated as being a part of the present disclosure.

What is claimed is:

1. A system for promoting and facilitating recycling packaging and reducing a carbon footprint of packaging, comprising:

a package formed by a unitary blank, the package having a plurality of members, the members including a plurality of panels including a pair of side panels and a plurality of flaps, the panels and flaps assembling into the package, the package defining a volume therein, the volume operative for holding a product;

a recycle strip, the recycle strip a member of the package perforated from the unitary blank, the recycle strip having perforated edges that traverse the panels of the unitary blank forming said package, the recycle strip approaching the edges of the side panels but terminating before the panel edges, leaving an unperforated portion at the edges of the side panel, the recycle strip operative for selectively disassembling the package when the strip is completely released from the package, the package disposed for easy flattening and compressing, the panels and flaps no longer defining a volume therein; and a strap, the strap formed by the unperforated portion of the strip approaching the side panel edges when the side panel edges are glued together when defining a volume therein, the strap remaining when the strip is released from the package, the package completely disassembling into a single unit held together by the strap, the flattened and compressed unit instantly acceptable for recycling.

2. The system as described in claim 1, wherein the package has a pair of principal display panels each having a bottom portion, the recycle strip traversing the package laterally towards the bottom portion such that principal display panels each have a predominant uninterrupted display area.

3. The system as described in claim 2, wherein the recycle strip has an interior surface and an exterior surface and the recycle strip is printed with a plurality of graphic design elements on the interior surface and the exterior surface.

4. A package that promotes and facilitates recycling, comprising:

a plurality of panels and a plurality of flaps formed from a unitary blank, said panels include a pair of side panels and a pair of principal display panels, said panels and said flaps assembling into a unitary package, defining a volume therein, the volume operative for holding a product;

a recycle strip perforated from the unitary blank, the recycle strip having perforated edges that traverse the panels of the unitary blank forming said package, the recycle strip approaching the edges of the side panels but terminating before the panel edges, leaving an unperforated portion at the edges of the side panel, the recycle strip operative for selectively disassembling the package when the strip is completely released from the package, the package disposed for easy flattening and compressing, the panels and flaps no longer defining a volume therein; and a strap formed from the unitary blank when the strip is released from the package, the strap maintaining the package as a flat and compressed unit no longer defining a volume therein, the flattened and compressed unit operative for accumulating in a minimal volume thereby increasing transportation capacity to a material recovery facility and further reducing the carbon foot print that is attributable to packaging.

5. The package as described in claim 4, wherein the principal display panels each have a bottom portion, the recycle strip traversing the package laterally towards the bottom portions such that principal display panels each have a predominant uninterrupted display area.

6. The package as described in claim 5, wherein the blank has an interior surface and an exterior surface and the recycle strip is printed with a plurality of graphic design elements on the interior surface and the exterior surface.

\* \* \* \* \*